(12) United States Patent
Grashuis et al.

(10) Patent No.: US 9,199,423 B2
(45) Date of Patent: Dec. 1, 2015

(54) METHOD AND DEVICE FOR MANUFACTURING A GREEN TIRE

(75) Inventors: Jan Kornelis Grashuis, Apeldoorn (NL); Wiebe Herman Ten Wolde, Enschede (NL); Erik Harm Jan Teule, Kampen (NL); Kees Janszen, Harderwijk (NL)

(73) Assignee: VMI HOLLAND B.V., Epe (NL)

( * ) Notice: Subject to any disclaimer, the term of this patent is extended or adjusted under 35 U.S.C. 154(b) by 393 days.

(21) Appl. No.: 13/814,360

(22) PCT Filed: Jun. 1, 2012

(86) PCT No.: PCT/NL2012/050387
§ 371 (c)(1),
(2), (4) Date: Apr. 15, 2013

(87) PCT Pub. No.: WO2013/006039
PCT Pub. Date: Jan. 10, 2013

(65) Prior Publication Data
US 2013/0205590 A1 Aug. 15, 2013

Related U.S. Application Data

(60) Provisional application No. 61/504,782, filed on Jul. 6, 2011.

(30) Foreign Application Priority Data

Jul. 6, 2011 (NL) .................................... 2007058

(51) Int. Cl.
*B29D 30/30* (2006.01)
*B29D 30/42* (2006.01)
(Continued)

(52) U.S. Cl.
CPC ............... *B29D 30/30* (2013.01); *B29D 30/20* (2013.01); *B29D 30/42* (2013.01); *B29D 30/46* (2013.01);
(Continued)

(58) Field of Classification Search
CPC ........ B29D 30/30; B29D 30/20; B29D 30/46; B29D 30/70; B29D 30/42; B29D 2030/241; B29D 2030/705; B29D 2030/3092; B60C 9/185; B60C 2009/1871; Y10T 29/53448; Y10T 29/49538
See application file for complete search history.

(56) References Cited

U.S. PATENT DOCUMENTS 3,894,906 A 7/1975 Pearce et al.
5,605,596 A 2/1997 McLaughlin
(Continued)

FOREIGN PATENT DOCUMENTS

CN  1772465 A  5/2006
CN  101293403 A  10/2008
(Continued)

OTHER PUBLICATIONS

Office Action dated Jul. 21, 2015 for Chinese Application No. 201280033346.4.
(Continued)

*Primary Examiner* — Sarang Afzali
(74) *Attorney, Agent, or Firm* — Ladas & Parry LLP

(57) ABSTRACT

The invention provides a method and a device for manufacturing a breaker ply package for a green tire, wherein a rubber band is supplied by a supply device (35) that can be moved between a first position and a second position, wherein the supply device can be moved between a first position in which the supply device is set for supplying the continuous rubber band at a supply direction which with the conveyance direction includes a first angle that equals the first cord angle, and a second position in which the supply device is set for supplying the continuous rubber band at a supply direction which with the conveyance direction includes a second angle that equals the second cord angle, wherein the second angle is not equal to the first angle.

15 Claims, 9 Drawing Sheets

(51) Int. Cl.
  *B29D 30/70* (2006.01)
  *B29D 30/20* (2006.01)
  *B29D 30/46* (2006.01)
  *B60C 9/18* (2006.01)
  *B29D 30/24* (2006.01)

(52) U.S. Cl.
  CPC .......... *B29D 30/70* (2013.01); *B29D 2030/241* (2013.01); *B29D 2030/3092* (2013.01); *B29D 2030/705* (2013.01); *B60C 9/185* (2013.01); *B60C 2009/1871* (2013.04); *Y10T 29/49538* (2015.01); *Y10T 29/53448* (2015.01)

(56) References Cited

U.S. PATENT DOCUMENTS

| | | | |
|---|---|---|---|
| 6,039,826 | A | 3/2000 | Okada |
| 6,773,530 | B2 * | 8/2004 | Zeh et al. ................ 156/111 |
| 7,118,642 | B2 * | 10/2006 | Bakoš et al. ............. 156/111 |
| 7,455,002 | B2 * | 11/2008 | Downing .................... 83/20 |
| 8,794,117 | B2 * | 8/2014 | Downing et al. ............. 83/453 |
| 2003/0168152 | A1 | 9/2003 | Suda |
| 2005/0077011 | A1 | 4/2005 | Pialot |

FOREIGN PATENT DOCUMENTS

| | | |
|---|---|---|
| DE | 37 12263 A1 | 10/1988 |
| EP | 1 065 043 A2 | 1/2001 |
| EP | 1 295 707 A2 | 3/2003 |
| EP | 1 541 326 A1 | 6/2005 |
| EP | 1 657 050 B1 | 12/2007 |
| JP | 2002-137310 A | 5/2002 |
| JP | 2002-192625 A | 7/2002 |

OTHER PUBLICATIONS espacenet English abstract of JP 2002-137310 A.
espacenet English abstract of CN 101293403 A.
espacenet English abstract of JP 2002-192625 A.
espacenet English abstract of CN 1772465 A.
espacenet English abstract of DE 37 12263 A1.

* cited by examiner

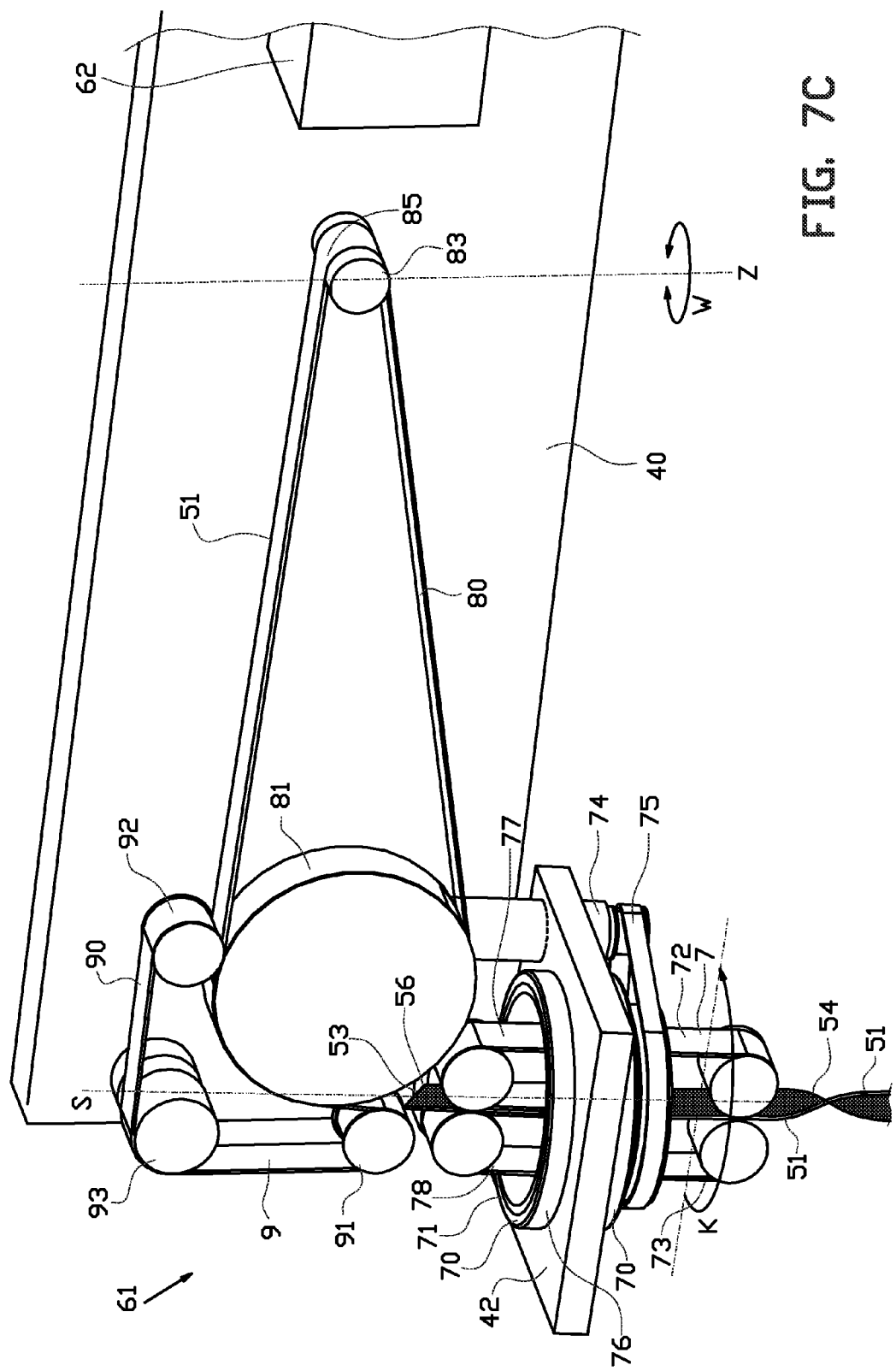

METHOD AND DEVICE FOR MANUFACTURING A GREEN TIRE

RELATED APPLICATION INFORMATION

This application is a 371 of International Application PCT/NL2012/050387 filed 1 Jun. 2012 entitled "Method And Device For Manufacturing A Green Tyre", which was published in the English language on 10 Jan. 2013, with International Publication Number WO 2013/006039 A1, and which claims priority from Netherlands Patent Application 2007058, filed 6 Jul. 2011, and U.S. Provisional Application No. 61/504,782 filed 6 Jul. 2011, the content of which is incorporated herein by reference.

BACKGROUND OF THE INVENTION

The invention relates to a device and a method for manufacturing an unvulcanized or green tire.

It is common practice to arrange various plies for a tire, such as for instance a car tire or truck tire, on a building drum. Various plies of rubber, such as for instance the airtight liner, the sidewalls and the tread, combined with reinforcement plies, such as for instance a carcass ply package and breaker ply package. The breaker ply package consists of two breaker plies composed of strips of rubber material spliced together and having longitudinal cords which per breaker ply are oriented at another cord angle. Because of the deviating cord angles the breaker plies are produced in individual devices according to a known method, so that supplying the strips, cutting off and splicing together per breaker ply can take place at the correct cord angle. Producing the breaker plies in this way takes up a lot space, however.

It is an object of the invention to provide a method and a device for the manufacturing of a green tire, wherein at least one of the drawbacks mentioned above is at least partially overcome.

SUMMARY OF THE INVENTION

According to a first aspect the invention provides a method for manufacturing a green tire, particularly for manufacturing a breaker ply package for the green tire on a support surface of a conveyor, wherein the conveyor has a conveyance direction, wherein the method comprises the steps of:

producing a first breaker ply having a longitudinal axis, a breaker ply length and mutually parallel cords at a pre-set first cord angle to the longitudinal axis, wherein a continuous rubber band provided with substantially parallel longitudinal cords is cut into first strips at the first cord angle, preferably at the location of a leading part of the rubber band, wherein a predetermined number of first strips with cords are juxtaposed substantially parallel at a set strip distance with respect to each other and are spliced together for forming the first breaker ply of a pre-set breaker ply length on the support surface of the conveyor, in the conveyance direction downstream of the first breaker ply producing a second breaker ply having a longitudinal axis, a breaker ply length and mutually parallel cords at a pre-set second cord angle to the longitudinal axis, wherein the continuous rubber band provided with substantially parallel longitudinal cords is cut into second strips at the second cord angle, preferably at the location of the leading part of the rubber band, wherein a predetermined number of second strips with cords are juxtaposed substantially parallel at a set strip distance with respect to each other and are spliced together for forming the second breaker ply of a pre-set breaker ply length on the support surface of the conveyor, wherein the continuous rubber band is supplied in the direction of the longitudinal cords by a supply device that can be moved between a first position and a second position, wherein the method further comprises the steps of:

prior to manufacturing the first breaker ply placing the supply device in the first position in which the supply device is set for supplying the continuous rubber band at a supply direction which with the conveyance direction includes a first angle that equals the first cord angle, and prior to manufacturing the second breaker ply moving the supply device from the first position into the second position in which the supply device is set for supplying the continuous rubber band at a supply direction which with the conveyance direction includes a second angle that equals the second cord angle, wherein the second angle is not equal to the first angle.

By using an adjustable supply device the invention provides a method for manufacturing a breaker ply package, wherein both the first breaker ply and the second breaker ply can be produced with the supply device.

In one embodiment the rubber band for the first breaker ply is supplied by the same supply device as the rubber band for the second breaker ply. One single supply device will therefore suffice, which from a logistic point of view can result in a considerable simplification of the method and the device required for carrying out the method.

In one embodiment the rubber band used for producing the first breaker ply is also used for producing the second breaker ply. One single rubber band will therefore suffice, which from a logistic point of view can result in a considerable simplification of the method and the device required for carrying out the method.

In one embodiment the method prior to the step of producing the second breaker ply further comprises the step of turning over the leading part of the rubber band to be cut off, about the longitudinal center line of the rubber band. The first cord angle of the first breaker ply and the second cord angle of the second breaker ply are exactly opposite in most green tires. The second cord angle can therefore be obtained by turning over the first cord angle in the manner described above. In that way loss of material arising as a result of an incorrect cord angle at switching from producing the first breaker ply to producing the second breaker ply, can be counteracted.

In one embodiment at its outer end the leading part of the rubber band to be cut off has a line of cut that was created when cutting off the last first strip, wherein the line of cut prior to turning over is at a first cord angle and after turning over is at the second cord angle. By turning over the line of cut can be used as outer end of the first of the second strips to be cut off for the manufacturing of the second breaker ply.

In one embodiment turning over comprises a substantially 180-degree rotation of the leading part of the rubber band to be cut off, about the longitudinal center line of the rubber band. By rotating the leading part of the rubber band to be cut off, half a turn the shape of its outer end is mirrored with respect to the situation prior to rotation.

In one embodiment on both sides of the band thickness the rubber band has a first main surface and an oppositely oriented second main surface, respectively, of the rubber band, wherein the first main surface and the second main surface at the location of the leading part of the rubber band to be cut off, after turning over are oppositely oriented with respect to their original orientation prior to turning over. As a result the rubber band can be arranged with the opposite main surface on the conveyor after turning over.

In one embodiment the supply device is provided with a turning section for turning over the rubber band in there and a passage section for passing the leading part of the rubber band to be cut off, through to the position in which the strips are cut off, wherein the method further comprises the steps of:

after cutting off the last first strip for producing the first breaker ply passing back the leading part of the rubber band to be cut off, from the passage section into a position in which the leading part of the rubber band to be cut off is beyond engagement of the passage section and is retained by the turning section, turning over the leading part of the rubber band to be cut off of the step as described above, in the overturned orientation again entering the leading part of the rubber band to be cut off, from the turning section into the passage section, producing the second breaker ply according to the steps described above. Because the leading part of the rubber band to be cut off is passed back into the turning section, the leading part of the rubber band to be cut off can be turned over within the turning section independent of or separate from the rest of the supply device.

In one embodiment the leading part of the rubber band to be cut off, after passing back is only retained by the turning section at the location of the supply device. In that way the leading part of the rubber band to be cut off can rotate freely with respect to the rest of the supply device.

In one embodiment the method further comprises the step of arranging rubber strips on the first breaker ply substantially during producing the second breaker ply. After both having been produced, the breaker plies are wound on a building drum, particularly on a Belt-Tread Drum. As the second breaker ply has been placed downstream of the first breaker ply, the second breaker ply that was produced second is placed first on the drum and after that the first breaker ply that was produced first is placed on the second breaker ply, wherein the breaker ply package is formed with the rubber strips between the first and second breaker ply. The invention furthermore advantageously utilises the time required for producing the second breaker ply to place rubber strips on the first breaker ply.

In one embodiment the rubber strips are arranged on the first breaker ply along its longitudinal sides, particularly the longitudinal sides extending in the conveyance direction.

In one embodiment the rubber strips are placed on the first breaker ply, wherein the rubber strips extend in a direction transverse to the conveyance direction to beyond the longitudinal sides of the first breaker ply.

In one embodiment the second cord angle substantially equals 180 degrees minus the first cord angle.

The invention furthermore provides a device for manufacturing a green tire, particularly for manufacturing a breaker ply package for the green tire, comprising:

a building drum, a conveyor with a support surface for conveying tire components on the support surface in a conveyance direction to the building drum, a supply device for supplying to the conveyor, a substantially continuous rubber band having substantially mutually parallel embedded longitudinal cords, in the direction of the longitudinal cords, and a cutting device for inclined at a cord angle cutting off strips from the continuous rubber band, preferably at the location of a leading part of the rubber band, wherein the supply device can be moved between a first position in which the supply device is set for supplying the continuous rubber band at a supply direction which with the conveyance direction includes a first angle that equals the first cord angle, and a second position in which the supply device is set for supplying the continuous rubber band at a supply direction which with the conveyance direction includes a second angle that equals the second cord angle, wherein the second angle is not equal to the first angle. By using an adjustable supply device the invention provides a compact device for manufacturing a breaker ply package.

In one embodiment the supply device is provided with a supporting body and a turning section disposed on the supporting body for turning over the leading part of the rubber band to be cut off, wherein the turning section is provided with engagement members and a bearing that connects the engagement members to the supporting body so as to be rotatable about a center line of overturning, wherein the engagement members are adapted for engaging the rubber band and imposing the rotation of the engagement members about the center line of overturning on the engaged rubber band. The first cord angle of the first breaker ply and the second cord angle of the second breaker ply are exactly opposite in most green tires. The second cord angle can therefore be obtained by turning over the first cord angle via the rotation applied as described above. In that way loss of material arising as a result of an incorrect cord angle at switching from producing the first breaker ply to producing the second breaker ply, can be counteracted.

In one embodiment the engagement members comprise one or more entry conveyor belt assemblies that are adapted for in the longitudinal direction of the rubber band entering the rubber band in an entry direction which at the location of the entry conveyor belt assemblies coincides with the center line of overturning. As the longitudinal direction of the rubber band at entering in the entry direction coincides with the center line of overturning, the rubber band can be turned over around its longitudinal center line.

In one embodiment the supply device is further provided with one or more passage conveyor belt assemblies for from the one or more entry conveyor belt assemblies passing the rubber band through to the cutting device, wherein the one or more entry conveyor belt assemblies are rotatable about the center line of overturning independent of the passage conveyor belt assemblies. As a result the entry conveyor belt assemblies are able to turn over the leading part of the rubber band to be cut off independent of the passage conveyor belt assemblies, which in view of the method described above regarding passing back, can be of importance.

In one embodiment the second cord angle substantially equals 180 degrees minus the first cord angle.

In one embodiment the device further comprises a rubber strip arranging device that is moveable over the conveyor for placing one or more rubber strips on one or more breaker plies on the conveyor.

The aspects and measures described in this description and the claims of the application and/or shown in the drawings of this application may where possible also be used individually. Said individual aspects may be the subject of divisional patent applications relating thereto. This particularly applies to the measures and aspects that are described per se in the sub claims.

SHORT DESCRIPTION OF THE DRAWINGS

The invention will be elucidated on the basis of a number of exemplary embodiments shown in the attached schematic drawings, in which.

Figure 6:
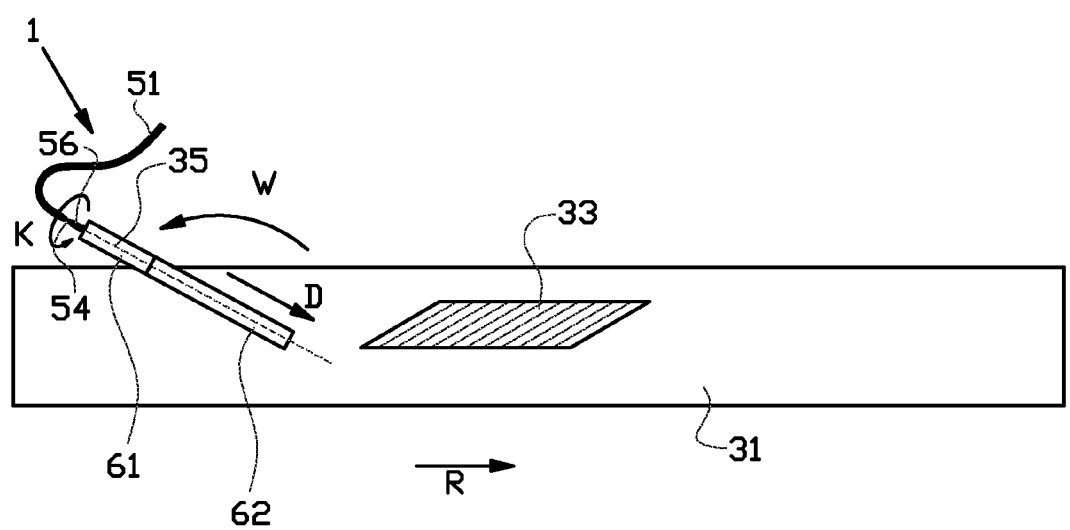
FIG. 6 shows the device according to FIG. 1 during an additional step prior to the step of FIG. 2C.

FIGS. 7A-D show a detail of the supply device during the additional step according to FIG. 6.

DETAILED DESCRIPTION OF THE DRAWINGS

Figure 1:
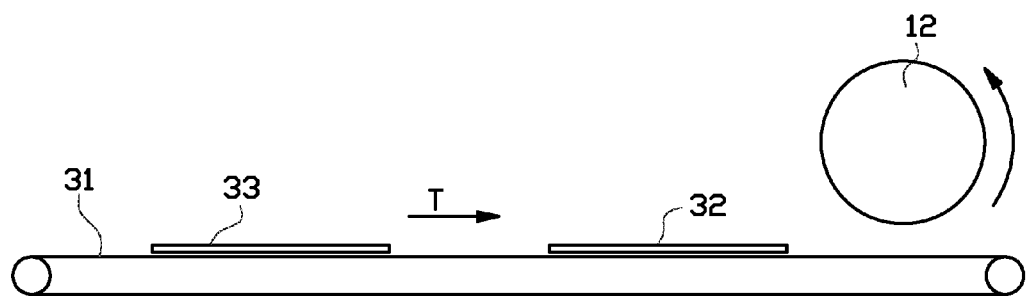
FIG. 1 shows a side view of a device for manufacturing a breaker ply-tread package according to a first embodiment of the invention.

FIG. 1 schematically shows a device 1 according to a first embodiment of the invention, for the manufacturing of a breaker ply-tread package. The device 1 is a part of a larger assembly including a belt-tread building drum 12 for manufacturing a green or unvulcanized green tire on said building drum 12.

The device 1 for manufacturing the breaker ply-tread package is placed near the building drum 12. The device 1 comprises a conveyor 31 having a support surface for conveying tire components, particularly a first breaker ply 33 and a second breaker ply 32, manufactured on the support surface, in a conveyance direction T to the building drum 12.

Figure 2A:
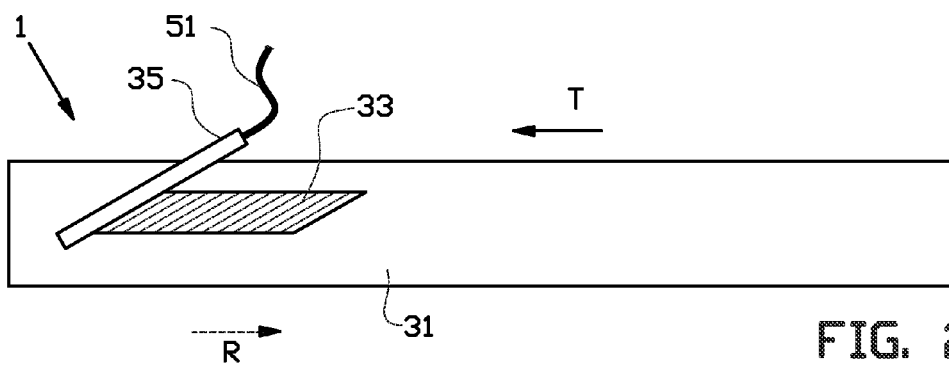
FIGS. 2A-2F show the device according to FIG. 1 with a supply device during various steps of a method for manufacturing breaker plies for the breaker ply-tread package.

As is shown in FIG. 2A the device 1 further comprises a supply device 35 and a cutting device that is not shown. The supply device 35 is adapted for supplying a substantially continuous rubber band 51 to the conveyor 31. The rubber band 51 comprises mutually substantially parallel embedded longitudinal cords. The rubber band 51 has a band thickness with on both sides of the band thickness a first main surface and oppositely oriented second main surface, respectively. The device 1 further comprises a cutting device that is not shown for, inclined at a first and a second cord angle, cutting off strips from a leading part of the continuous rubber band 51. The leading part of the continuous rubber band 51 means the part of the rubber band 51 that has been entered in the supply device 35 to be cut off into strips. The strips cut off inclined are juxtaposed centered on the center line of the support surface of the conveyor 31, in the conveyance direction T and connected to one another by a splice for forming the first breaker ply 33 and the second breaker ply 32. The conveyor 31 is moved back step by step in the direction R as shown in FIGS. 2A and 2C.

The steps of the method for manufacturing the breaker ply-tread package are explained below on the basis of FIGS. 2A-F.

FIG. 2A shows how in the manner described above the first breaker ply 33 is first to be formed on the support surface of the conveyor 31. The supply device 35 is placed in the first position in which the supply device 35 is set for supplying the continuous rubber band 51 at a supply direction D which with the conveyance direction T includes a first angle that equals the first cord angle H1. The first breaker ply 33 is composed of strips from the rubber band 51 that are cut off at said first cord angle H1. When the first breaker ply 33 is ready it is moved, in this example in the direction R, as shown in FIG. 2B, so that the second breaker ply 32 can be manufactured on the support surface of the conveyor 31 in the conveyance direction T downstream of the first breaker ply 33.

Figure 2B:
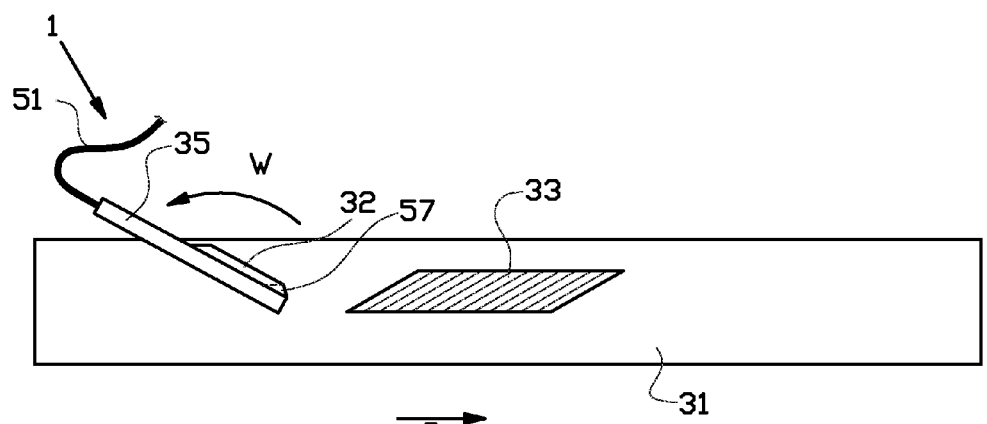
Figure 2C:
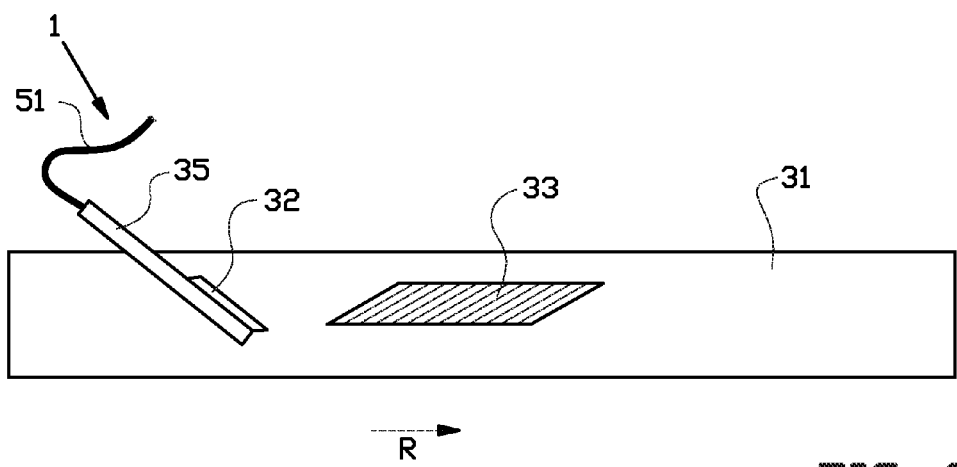

As shown in FIG. 2B the supply device 35 is moved, particularly swung over a swivel angle W, to the second position in which the supply device 35 is set for supplying the continuous rubber band 51 at a supply direction D which with the conveyance direction T includes a second angle that equals the second cord angle H2. In said second position the second breaker ply 32 can be formed in the above-mentioned manner using strips from the rubber band 51 that are cut off at a second cord angle H2. Preferably the second cord angle is not equal to the first cord angle H1, particularly substantially equal to 180 degrees minus the first cord angle H1. Manufacturing the second breaker ply 32 is shown in FIGS. 2C, 2D and 2E.

Figure 2D:
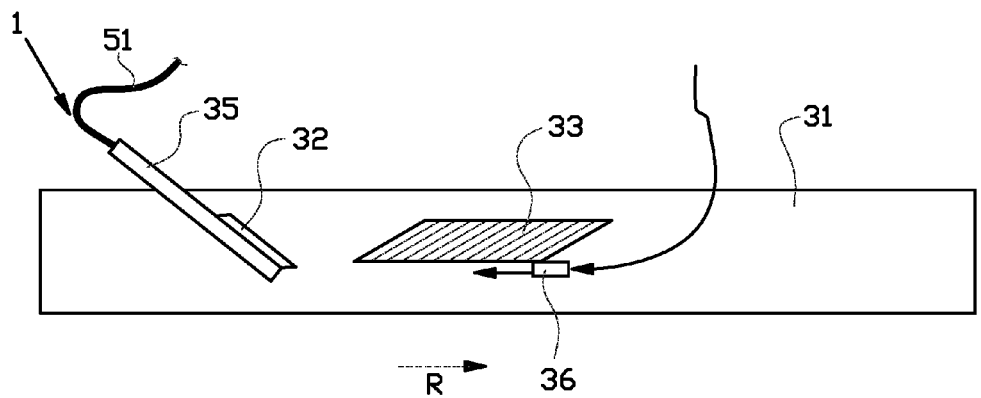

During manufacturing the second breaker ply 32, which is manufactured in the same way as the first breaker ply 33, a rubber strip arranging device 36 that can be moved over the conveyor 31 ensures the placing of one or more rubber strips 37 on the first breaker ply 33 on the conveyor 31, as shown in FIG. 2D.

Figure 2E:
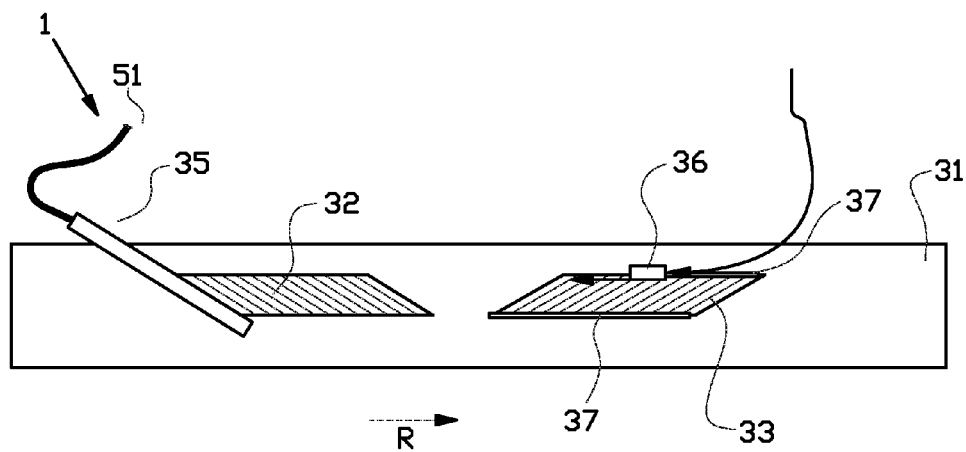
Figure 2F:
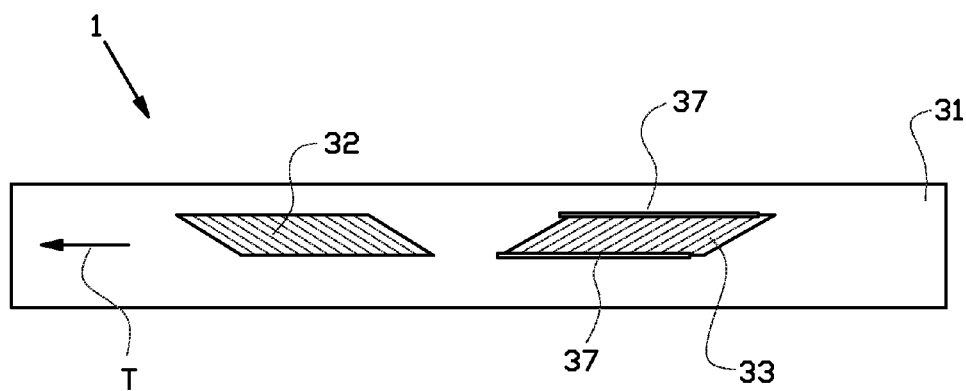
Figure 3:
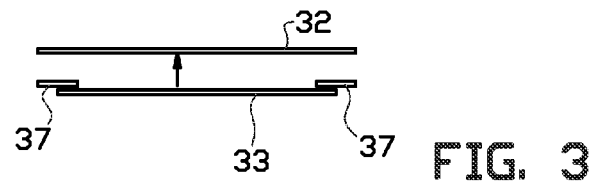
FIG. 3 shows a schematic view in cross-section of the breaker package formed by the steps of the method according to FIGS. 2A-2F.

On their sides facing the building drum the strips 37 preferably project a little beyond the first breaker ply 33, whereas on the side of the first breaker ply 33 facing away from the building drum they indeed have to stop slightly before the end of the first breaker ply 33, as shown in FIG. 2F.

One or more rubber strip arranging devices 36 that can be moved laterally, can arrange both strips 37, as shown in FIGS. 2D and 2E.

When both breaker plies 32, 33 are ready, as shown in FIG. 2F, they are conveyed in the conveyance direction T to the building drum 12 and wound thereon, as shown in FIG. 1. As in the conveyance direction T, the second breaker ply 32 is placed downstream of the first breaker ply 33, the second breaker ply 32 is first to be placed on the surface of the building drum 12 and after that the first breaker ply 33 is placed on the second breaker ply 32, wherein a breaker ply package is formed wherein the rubber strips are placed between the first and the second breaker ply.

Figure 4A:
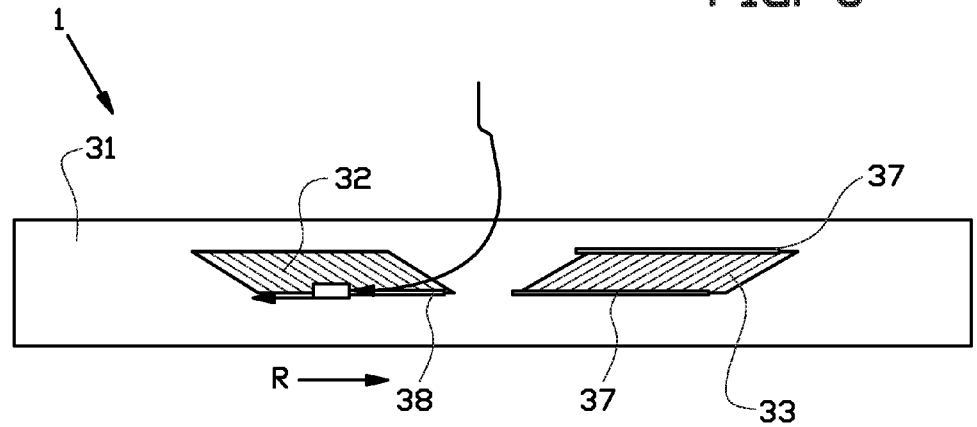
FIGS. 4A and 4B show the device according to FIG. 1 with the supply device during two additional steps after the step of FIG. 2F.
Figure 4B:
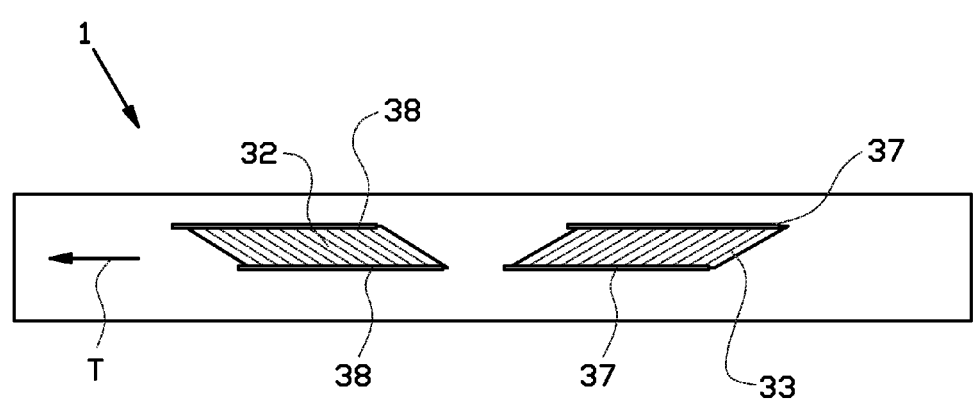

In an alternative embodiment of the method described above the second breaker ply 32 is also provided with rubber strips 38, as shown in FIG. 4A. When both breaker plies 32, 33 are ready, as shown in FIG. 4B, they are conveyed in conveyance direction T to the building drum 12 and wound thereon, as shown in FIG. 1. Second breaker ply 32 that was produced second including rubber strips 38 is the first to be wound on the surface of the building drum 12, and subsequently the first breaker ply 33 that was produced first including the rubber strips 37 arranged thereon. Thus a breaker ply package is formed having the rubber strips 37 between the breaker plies 32, 33 and the rubber strips 38 between the breaker ply 32 and the circumferential surface of the building drum 12.

Figure 5:
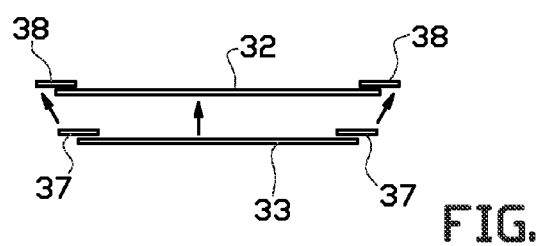
FIG. 5 shows a schematic view in cross-section of the breaker package formed by the steps of FIGS. 2A-2F, 4A and 4B.

When arranging the edges of the rubber strips 37, 38 that extend beyond the breaker plies 32, 33 will connect one to the other, so that a rubber strip 37, 38 is formed that at least partially encloses the second breaker ply 32, as shown in FIG. 5.

When carrying out the methods described above loss of material arises after each movement of the supply device 35 according to the step in FIG. 2B. After swinging the supply device 35 over swivel angle W the supply direction D of the rubber band 51 has indeed changed, but the angle of the line of cut at the outer end of the leading part 56 of the rubber band 51 to be cut off, that was created when cutting off the last strip for the first breaker ply 33 at the first cord angle H1, does not correspond with the second cord angle H2, as it is wanted for manufacturing the second breaker ply 32. In order to correct the line of cut and obtain the wanted second cord angle H2, first a triangular part 57, as shown in FIG. 2B, needs to be cut off from of the leading part 56 of the rubber band 51 to be cut off, before cutting off second strips 55 for the second breaker ply 32 can be started with.

The first cord angle H1 of the first breaker ply 33 and the second cord angle H2 of the second breaker ply 32 are exactly opposite in most green tires. The second cord angle H2 therefore substantially equals 180 degrees minus the first cord angle H1. The second cord angle H2 can therefore be obtained by turning over or mirroring the first angle cord angle H1. This insight resulted in the additional inventive step for the methods described above, which step will be further described below.

The additional step, schematically shown in FIG. 6, regards the turning over, tilting, inverting or rotating of the leading part 56 of the rubber band 51 to be cut off over an angle of 180 degrees in the turning direction K about a longitudinal center line of the rubber band 51. For that purpose the supply device 35 on the side where the rubber band 51 is entered is provided with an entry section 61, able to turn over the rubber band 51 in manner to be further described and subsequently passing it through to an exit section 62 that conveys the rubber band 51 in a position over the support surface of the conveyor 31 for at the location of the leading part 56 of the rubber band 51 to be cut off, be cut off into strips. Due to turning over, the first main surface and the second main surface of the rubber band 51 at the location of the leading part 56 of the rubber band 51 to be cut off, after turning over are oriented oppositely with respect to their original orientation prior to turning over. The additional step can be carried out prior to manufacturing the second breaker ply 32, preferably after the step and as shown in FIG. 2A, simultaneously with or prior to the step as shown in FIG. 2C.

By not only swinging the supply device 35 but also turning over the rubber band 51 in the entry section 61 prior to rubber band 51 being cut off, a situation can be created in which the leading part 56 of the rubber band 51 to be cut off is turned over with respect to the situation as shown in FIG. 2A. Because of turning over the rubber band 51 the angle of the line of cut at the outer end of the leading part 56 of the rubber band 51 to be cut of is oriented oppositely or mirrored to the angle of the line of cut prior to turning over and thus—after swinging the supply device 35 over angle W—corresponds with the second cord angle H2.

By turning over the leading part 56 of the rubber band 51 to be cut off in the entry section 61 the necessity of cutting off a triangular part 57 at the leading part 56 of the rubber band 51 to be cut off can be removed and the quantity of material lost during manufacturing the breaker ply-tread package can be considerably reduced. Moreover for manufacturing both the first breaker ply 33 and the second breaker ply 32 the same supply device 35 and the same rubber band 51 can be used, so that switching again and again between various supply devices and different sources of rubber bands is not necessary. In that way the time required for manufacturing a green tire can be reduced.

In FIGS. 7A-D an exemplary embodiment of the supply device 35, particularly its entry section 61, is shown in more detail.

The supply device 35 is provided with an elongated supporting body 40. The supporting body 40 is connected to a frame that is not shown via a swivel axle Z for with respect to the frame swinging the supply device 35 in a swinging rotary motion over swivel angle W about the swivel center line Z.

The entry section 61 and the exit section 62 are consecutively disposed in the supply direction D on the supporting body 40. The entry section 61 ensures the entry of the rubber band 51 in the supply device 35 according to a path that is indicated by the arrows A, B and C. The exit section 62 is provided with a conveyor belt assembly that is not shown and with which the rubber band 51 entered by the entry section 61 is passed onwards in the supply direction D to over the support surface of the conveyor. In the manner described above, the rubber band 51 is subsequently cut off at the wanted strip length into strips for manufacturing the breaker plies 32, 33 shown in FIGS. 2A-F.

The entry section 61 in this example comprises a turning section 7 for in a vertical entry direction A entering the rubber band 51. In a manner to be further described the turning section 7 is adapted for during the step according to FIG. 6 turning over the leading part 56 of the rubber band 51 to be cut off. The entry section 61 is furthermore provided with a passage section having a first passage conveyor belt assembly 8 and a second passage conveyor belt assembly 9 which jointly engage the leading part 56 of the rubber band 51 to be cut off as entered by the turning section 7, clamp it and pass it onwards to the cutting device via the passage path indicated by the arrows B and C.

The turning section 7 comprises an annular bearing 76 having an outer ring 70 that is fixedly connected to a flange 42 of the supporting body 40 and an inner ring 71 that is rotatable within the outer ring 70 about a center line of overturning S. The turning section 7 is provided with engagement members that are fixedly connected to the inner ring 71 and serve to engage the rubber band 51. In this example the engagement members are first entry conveyor belt assembly 72 and a second entry conveyor belt assembly 73, the conveyor belts 77, 78 of which have been disposed in the center of the inner ring 71 in mutual abutting contact or at a short distance from each other, so that at its entry in the vertical entry direction A the rubber band 51 is engaged between the conveyor belts of the entry conveyor belt assemblies 72, 73. Considered in the vertical entry direction A, the entry conveyor belt assemblies 72, 73 are elongated and extend on both sides of the annular bearing 76 for at the bottom side engaging the rubber band 51 in a clamping manner, passing the rubber band 51 onwards through the center of the inner ring 71 and exiting the rubber band 51 on the other side of the annular bearing 76.

The turning section 7 is provided with an entry drive that is not shown and that is adapted for driving the first and/or second entry conveyor belt assembly 72, 73 in two directions. The turning section 7 is furthermore provided with a turning drive 74 which via a transmission, in this example a drive belt 75, is connected to the inner ring 71 of the annular bearing 76. The turning drive 74 is adapted for rotating the inner ring 71 in two directions about the center line of overturning S, and thus the entry conveyor belt assemblies 72, 73 disposed in the inner ring 71.

Figure 7A:
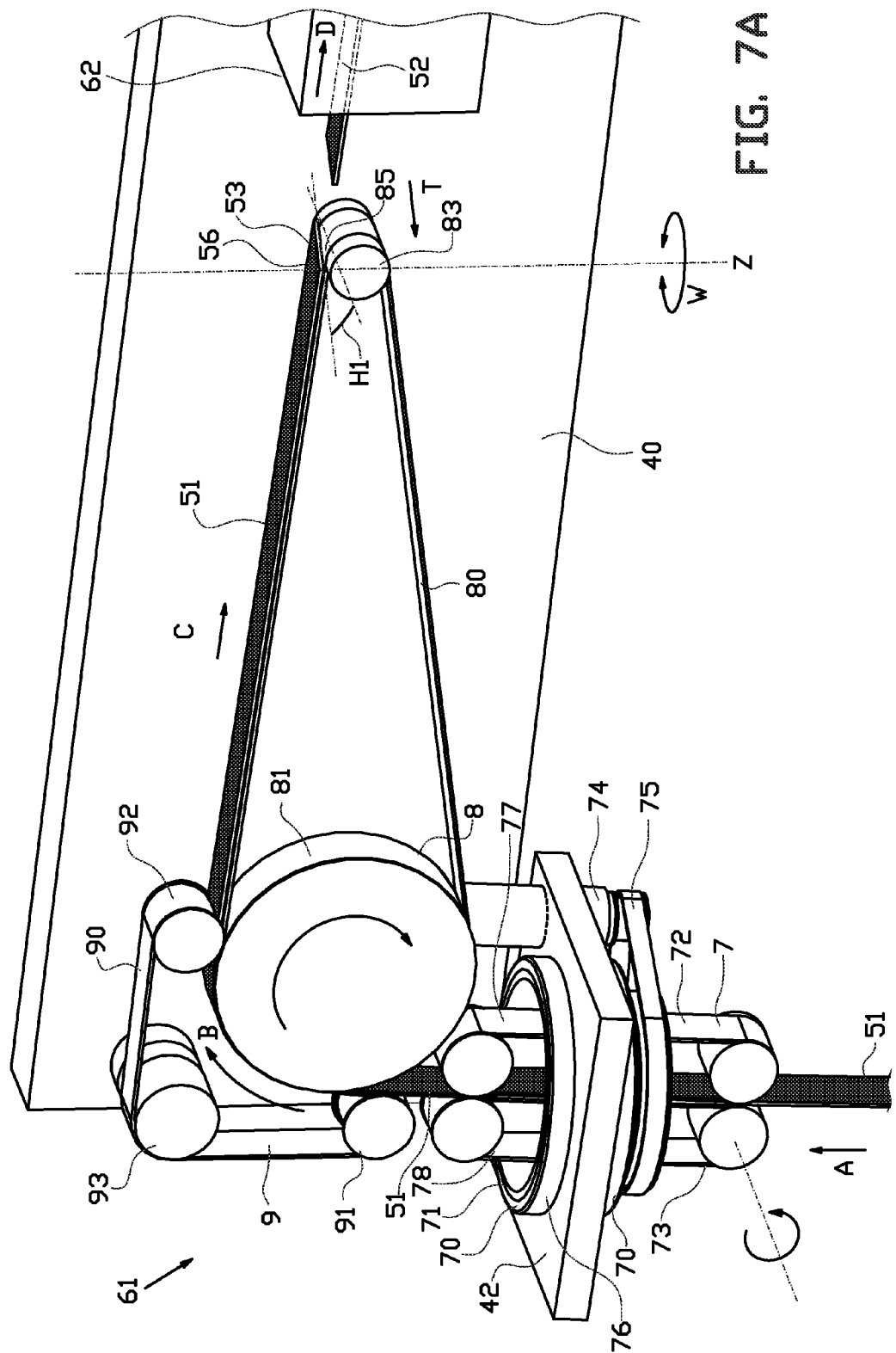

As shown in FIG. 7A the passage conveyor belt assemblies 8, 9 are disposed in the extension of the elongated entry conveyor belt assemblies 72, 73. The first passage conveyor belt assembly 8 comprises a large wheel 81 and a number of smaller wheels 82, 83 that jointly stretch a first passage conveyor belt 80. One of the wheels 81-83 is coupled to a passage drive that is not shown for driving the first passage conveyor belt assembly 8.

The second passage conveyor belt assembly 9 comprises three wheels 91-93 that stretch a second passage conveyor belt 90. At the location of the path indicated by arrow B, the second passage conveyor belt 90 is disposed in abutting contact with or at a short distance from the first passage conveyor belt 80 for in between them engaging, clamping and passing onwards the rubber band 51 that is supplied from the turning section 7. In this example the second passage conveyor belt 90 is not driven but during passing through moves passively along with the movement of the rubber band 51. At the location of the large wheel 81 the second passage conveyor belt 90 presses the rubber band 51 against the first passage conveyor belt 80 so that at that location the rubber band 51 follows the contour of the large wheel 81. In that way the rubber band 51 entered in the vertical entry direction A is bent around via the path indicated by arrow B to the horizontal passage direction C indicated by arrow C.

FIGS. 7A-D schematically show the operation of the entry section 61 of the supply device 35 for according to the step of FIG. 6 turning over the leading part 56 of the rubber band 51 to be cut off.

In FIG. 7A the situation is shown in which the rubber band 51 in the vertical entry direction A has been entered in the supply device 35. The rubber band 51 is supplied from a supply roll or a strip production unit in a manner known per se via one or more loop-shaped paths that are not shown. Up until its entry in the supply device 35, the rubber band 51 is free to move or deform within its elastic range.

The entry conveyor belt assemblies 72, 73 and the passage conveyor belt assemblies 8, 9 are driven such that via the path indicated by the arrows A, B, C and D the rubber band 51 is supplied to in the exit section 62 of the supply device 35. Between the entry section 61 and the exit section 62 a cutting device that is not shown moves for cutting off a first strip 52 at the wanted strip length from the leading part 56 of the rubber band 51 to be cut off. The supply device 35 is in the first position, as a result of which the first strips 52 that are cut off from the rubber band 51, are cut off at an angle corresponding with the first cord angle H1. The resulting first strips 52 can be used for manufacturing the first breaker ply 33 in the manner described above. The first strip 52 shown in FIG. 7A is the last first strip 52 which has been cut off from the rubber band 51 at the first cord angle H1 for manufacturing the first breaker ply 33. The line of cut 53 at the outer end of the leading part 56 of the rubber band 51 to be cut off is the first cord angle H1.

Figure 7B:
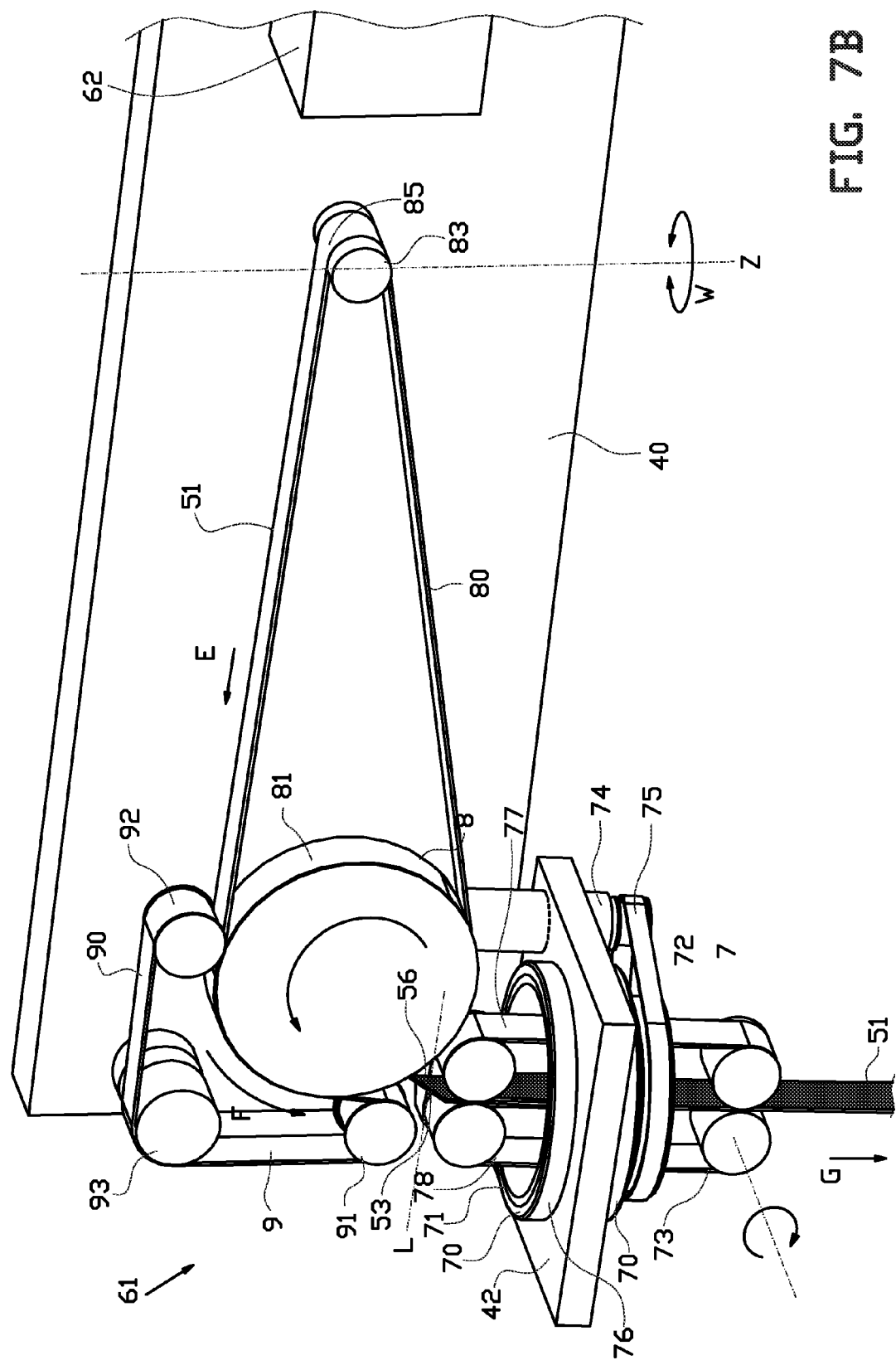

In FIG. 7B the situation is shown in which the entry conveyor belt assemblies 72, 73 and the passage conveyor belt assemblies 8, 9 have been driven opposite with respect to the situation shown in FIG. 7A. As a result the rubber band 51 has been passed back from the exit section 62 into the entry section 61 along the pass-back path that is indicated by the arrows E, F and G. Passing back the rubber band 51 is stopped in the situation shown, in which the leading part 56 of the rubber band 51 to be cut off has arrived beyond engagement of the entry conveyor belt assemblies 8, 9 and only at the level of the pass-back limit L has been clamped between the entry conveyor belt assemblies 72, 73 of the turning section.

In FIG. 7C the situation is shown in which the inner ring 71 and the entry conveyor belt assemblies 72, 73 of the turning section 7 disposed therein have been driven by the turning drive 74 in an approximately 180-degree rotation about the center line of overturning S with respect to the outer ring 70 of the bearing 76. The 180-degree rotation of the entry conveyor belt assemblies 72, 73 is applied to the leading part 56 of the rubber band 51 to be cut off that is clamped by the turning section 7, which part as a result at the location of the clamping is turned 180 degrees about the longitudinal center line of the rubber band 51 with respect to the situation as shown in FIG. 7B. The angle of the line of cut 53 of the leading part 56 of the rubber band 51 to be cut off, in the situation according to FIG. 7C is mirrored to the angle of the line of cut 53 in the situation according to FIG. 7B and thus is at the wanted second cord angle H2. In the free part of the rubber band 51 below the entry section 61 a twist 54 has arisen to compensate for the turning over of the leading part 56 of the rubber band 51 to be cut off. Said twist 54 is shown in a strongly exaggerated manner and will in reality take place over a larger length and therefore gradually. The twist 54 will in most cases be smaller than 180 degrees as the supply device 35 itself swings over a swivel angle W that is opposite the turning direction K.

Figure 7D:
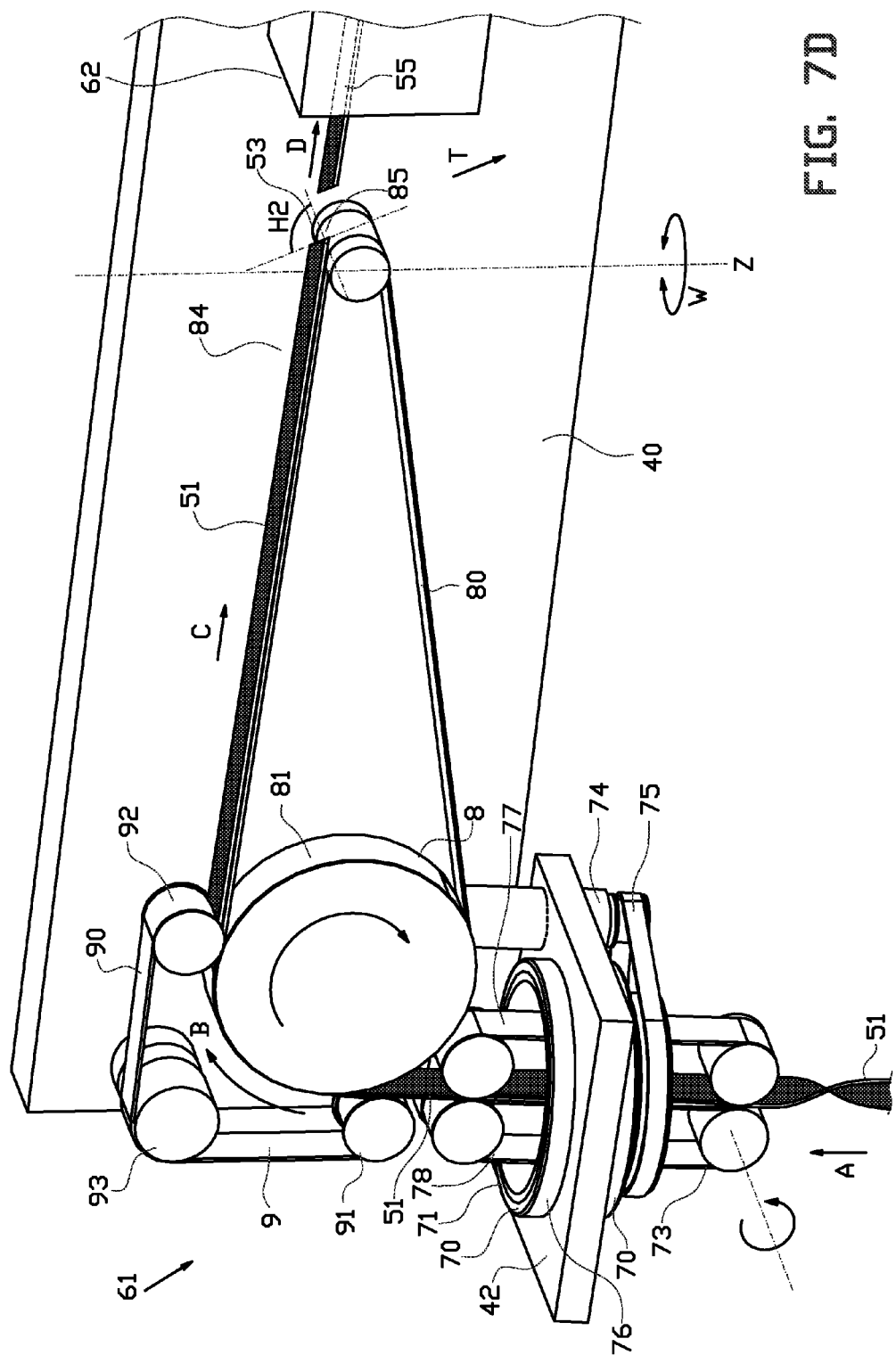

In FIG. 7D the situation is shown in which the entry conveyor belt assemblies 72, 73 and the passage conveyor belt assemblies 8, 9 have been driven such that the rubber band 51 is supplied by the supply device 35 via the path indicated by the arrows B, C and D. This situation can be compared with the situation as shown in FIG. 7A. However, the leading part 56 of the rubber band 51 to be cut off and the rest of the rubber band 51 that have passed through the turning section 7, are now guided through the supply device 35 in an orientation that is opposite the original orientation of the rubber band 51 as shown in FIG. 7A. The twist 54 in the rubber band 51 takes place prior to the rubber band 51 entering the entry section 61 of the supply device 35. In that way the entire length of the entered part of the rubber band 51 within the supply device 35 is turned over. In any case per second strip 55 to be cut off, at least the leading part 56 of the rubber band 51 to be cut off has each time been turned over.

In the situation according to FIG. 7D, the line of cut 53 at the outer end of the leading part 56 of the rubber strip 51 to be cut off is mirrored with respect to the situation as shown in FIG. 7A and thus equals the second cord angle H2. The above-mentioned turning over of the rubber band 51 about the center line of overturning S—in combination with the swinging of the supply device 35 over the swivel angle W, as shown in FIG. 2B—ensures that the rubber band is now ready for cutting off second strips 56 therefrom for manufacturing the second breaker ply 32.

The actions shown in FIGS. 7B-D can be carried out after the step of manufacturing the first breaker ply 33 according to FIG. 2A, during the step of swinging according to FIG. 2B or prior to the step of manufacturing the second breaker ply 32 according to FIG. 2C. Preferably the actions according to FIGS. 7B-D are carried out during the step of swinging according to FIG. 2B, so that the turned leading part 56 of the rubber band 51 to be cut off immediately or shortly after swinging is ready for manufacturing strips for the second breaker ply 32.

In order to prevent further twisting of the rubber band 51 the inner ring 71 of the bearing 76 can be rotated opposite with respect to the turning direction K, as shown in FIG. 7C, prior to manufacturing a new first breaker ply 33. In that case there is only question of a reciprocating turning motion of the inner ring 71 with respect to the outer ring 70 of the bearing 76 within the range of 180 degrees about the center line of overturning S.

The turning section 7 shown in 9A-D is an example of a part of the supply device 35 that is able to carry out the turning over of the leading part 56 of the rubber band 51 to be cut off according to the step of FIG. 6. If loss of material is taken for granted and the steps according to FIGS. 2A-F are carried out without the additional turning step according to FIG. 6, the turning section 7 can be left out and a simplified entry section 61 will suffice. The simplified entry section 61 then will not comprise turning section 7, so that the rubber band 51 enters the entry section 61 without the possibility to be turned over.

Summarising the invention relates to a method and a device for manufacturing a breaker ply package for a green tire, wherein a rubber band is supplied by a supply device that can be moved between a first position and a second position, wherein the supply device can be moved between a first position in which the supply device is set for supplying the continuous rubber band at a supply direction which with the conveyance direction includes a first angle that equals the first cord angle, and a second position in which the supply device is set for supplying the continuous rubber band at a supply direction which with the conveyance direction includes a second angle that equals the second cord angle, wherein the second angle is not equal to the first angle.

The above description is included to illustrate the operation of preferred embodiments of the invention and not to limit the scope of the invention. Starting from the above explanation many variations falling within the spirit and scope of the present invention will be evident to an expert.

The invention claimed is:

1. A method for manufacturing a green tire, particularly for manufacturing a breaker ply package for the green on a support surface of a conveyor, wherein the conveyor has a conveyance direction, wherein the method comprises the steps of:
    producing a first breaker ply having a longitudinal axis, a breaker ply length and mutually parallel cords at a pre-set first cord angle to the longitudinal axis, wherein a leading part of a continuous rubber band provided with substantially parallel longitudinal cords is cut into first strips at the pre-set first cord angle, wherein a predetermined number of first strips with cords are juxtaposed substantially parallel at a set strip distance with respect to each other and are spliced together for forming the first breaker ply of a pre-set breaker ply length on the support surface of the conveyor,
    in the conveyance direction downstream of the first breaker ply producing a second breaker ply having a longitudinal axis, a breaker ply length and mutually parallel cords at a pre-set second cord angle to the longitudinal axis of the second breaker ply, wherein the leading part of the continuous rubber band provided with substantially parallel longitudinal cords is cut into second strips at the pre-set second cord angle, wherein a predetermined number of second strips with cords are juxtaposed substantially parallel at a set strip distance with respect to each other and are spliced together for forming the second breaker ply of a pre-set breaker ply length on the support surface of the conveyor,
    wherein the continuous rubber band is supplied in the direction of the longitudinal cords by a supply device that can be moved between a first position and a second position, wherein the method further comprises the steps of:
    prior to manufacturing the first breaker ply placing the supply device in the first position in which the supply device is set for supplying the continuous rubber band at a supply direction which with the conveyance direction includes a first angle that equals the pre-set first cord angle, and
    prior to manufacturing the second breaker ply moving the supply device from the first position into the second position in which the supply device is set for supplying the continuous rubber band at a supply direction which with the conveyance direction includes a second angle that equals the pre-set second cord angle, wherein the second angle is not equal to the first angle,
    wherein the method prior to the step of producing the second breaker ply further comprises the step of turning over the leading part of the rubber band to be cut off, about a longitudinal center line of the rubber band,
    wherein the rubber band for the first breaker ply is supplied by the same supply device as the rubber band for the second breaker ply, and
    wherein the rubber band, used for producing the first breaker ply, is also used for producing the second breaker ply.

2. The method according to claim 1, further comprising the step of arranging rubber strips on the first breaker ply substantially during producing the second breaker ply.

3. The method according to claim 2, wherein the rubber strips are arranged on the first breaker ply along its longitudinal sides and particularly extend along the longitudinal sides in the conveyance direction.

4. The method according to claim 3, wherein the rubber strips are placed on the first breaker ply, wherein the rubber strips extend in a direction transverse to the conveyance direction to beyond the longitudinal sides of the first breaker ply.

5. The method according to claim 1, wherein the supply device is provided with a turning section for turning over the rubber band in there and a passage section for passing the leading part of the rubber band to be cut off, through to a position in which the strips are cut off, wherein the method further comprises the steps of:
    after cutting off the last first strip for producing the first breaker ply passing back the leading part of the rubber band to be cut off, from the passage section into a position in which the leading part of the rubber band to be cut off is beyond engagement of the passage section and is retained by the turning section,
    turning over the leading part of the rubber band to be cut off to produce an overturned orientation,
    in the overturned orientation again entering the leading part of the rubber band to be cut off, from the turning section into the passage section, and
    producing the second breaker ply.

6. The method according to claim 5, wherein the leading part of the rubber band to be cut off, after passing back is only retained by the turning section at the location of the supply device.

7. The method according to claim 1, wherein at an outer end the leading part of the rubber band to be cut off has a line of cut that was created when cutting off a last of the first strips, wherein the line of cut prior to turning over is at the pre-set first cord angle and after turning over is at the pre-set second cord angle.

8. The method according to claim 1, wherein turning comprises a substantially 180-degree rotation of the leading part of the rubber band to be cut off, about the longitudinal center line of the rubber band.

9. The method according to claim 1, wherein on both sides of the band thickness the rubber band has a first main surface and an oppositely oriented second main surface, respectively, of the rubber band, wherein the first main surface and the second main surface at the location of the leading part of the rubber band to be cut off, after turning over are oppositely oriented with respect to their original orientation prior to turning over.

10. The method according to claim 1, wherein the second cord angle substantially equals 180 degrees minus the first cord angle.

11. A device for manufacturing a green tire, particularly for manufacturing a breaker ply package for the green tire tyro, comprising:
    a building drum,
    a conveyor with a support surface for conveying tire components on the support surface in a conveyance direction to the building drum, a supply device for supplying to the conveyor, a substantially continuous rubber band having substantially mutually parallel embedded longitudinal cords, in the direction of the longitudinal cords, and a cutting device for inclining at a cord angle cutting off strips from a leading part of the continuous rubber band, wherein the supply device can be moved between a first position in which the supply device is set for supplying the continuous rubber band at a supply direction which with the conveyance direction includes a first angle that equals the first cord angle, and a second position in which the supply device is set for supplying the continuous rubber band at a supply direction which with the conveyance direction includes a second angle that equals the second cord angle, wherein the second angle is not equal to the first angle, wherein the supply device is provided with a supporting body and a turning section disposed on the supporting body for turning over a leading part of the rubber band to be cut off, wherein the turning section is provided with engagement members and a bearing that connects the engagement members to the supporting body so as to be rotatable about a center line of overturning, wherein the engagement members are adapted for engaging the rubber band and imposing the rotation of the engagement members about the center line of overturning on the engaged rubber band.

12. The device according to claim 11, wherein the engagement members comprise one or more entry conveyor belt assemblies that are adapted for in a longitudinal direction of the rubber band, entering the rubber band in an entry direction which at the location of the entry conveyor belt assemblies coincides with the center line of overturning.

13. The device according to claim 12, wherein the supply device is further provided with one or more passage conveyor belt assemblies for, from the one or more entry conveyor belt assemblies, passing the rubber band through to the cutting device, wherein the one or more entry conveyor belt assemblies are rotatable about the center line of overturning independent of the passage conveyor belt assemblies.

14. The device according to claim 11, wherein the second cord angle substantially equals 180 degrees minus the first cord angle.

15. The device according to claim 11, further comprising one or more rubber strip arranging devices that are moveable over the conveyor for placing one or more rubber strips on one or more breaker plies on the conveyor.

* * * * *